United States Patent Office 2,876,579
Patented Mar. 10, 1959

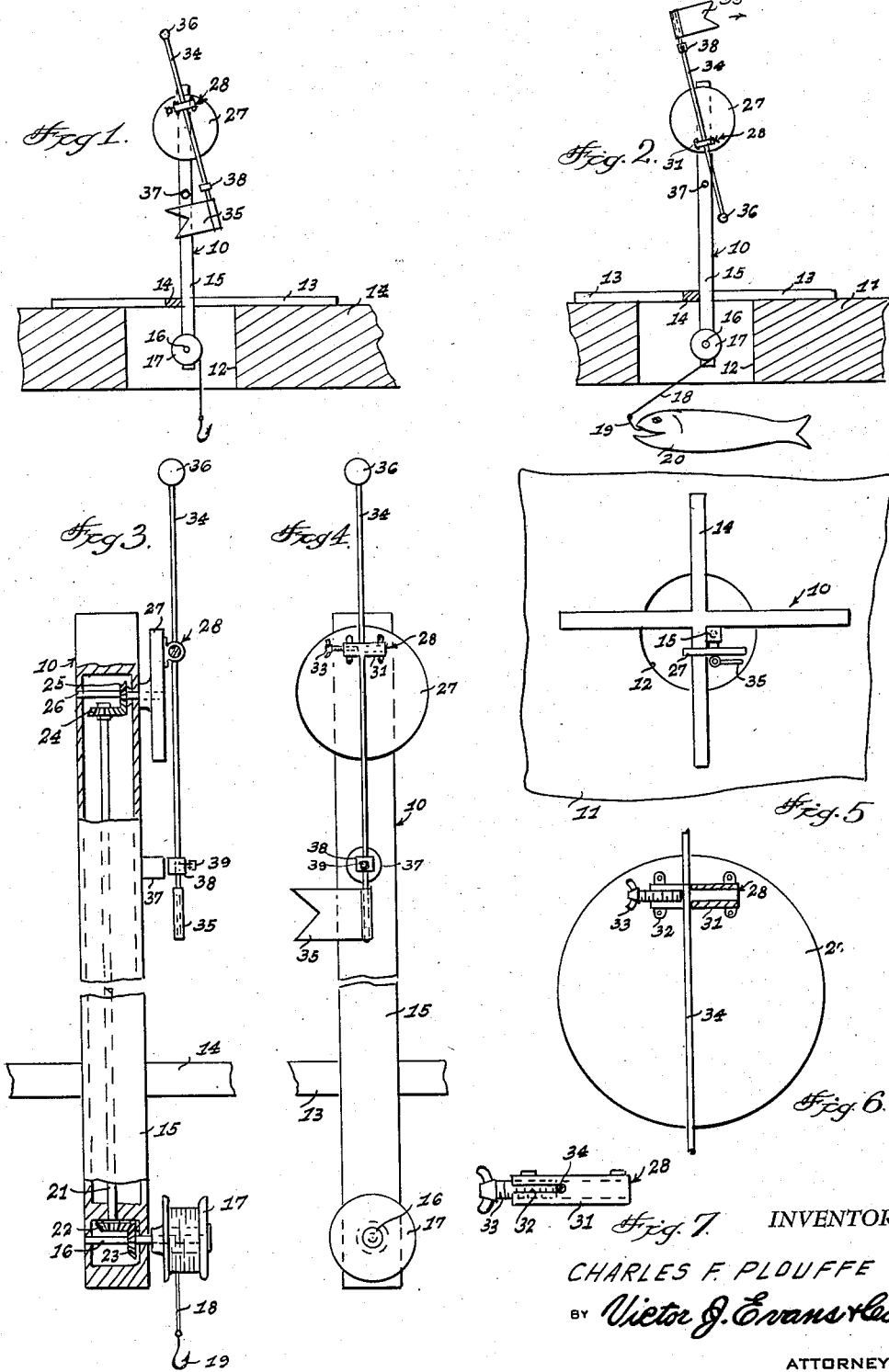

2,876,579

SIGNALING DEVICE FOR ICE FISHING APPARATUS

Charles F. Plouffe, Worcester, Mass.

Application October 18, 1957, Serial No. 691,029

4 Claims. (Cl. 43—17)

This invention relates to a fishing accessory, and more particularly to a signalling device for use by persons fishing through ice.

The object of the invention is to provide a signalling device which is adapted to be used by persons fishing through the ice whereby a movable signal is actuated when the fish strikes or bites the line.

Another object of the invention is to provide a fish signalling device which includes a flag that is adapted to be continually rotated as the fish strikes or pulls on the fishing line so that the person using the device will know when to pull in the fishing line.

Another object of the invention is to provide a signalling device for ice fishing apparatus which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a fragmentary elevational view, showing the signalling device of the present invention, and showing the flag in down position.

Figure 2 is a view similar to Figure 1, but showing the flag in raised position, as when a fish strikes the line.

Figure 3 is a view taken at right angles to the view shown in Figure 1, and with parts broken away and in section.

Figure 4 is a view taken at right angles to the view shown in Figure 3.

Figure 5 is a top plan view showing the signalling device of the present invention.

Figure 6 is an elevational view, showing the disc and clamp, and with parts broken away and in section.

Figure 7 is an elevational view of the clamp.

Referring in detail to the drawings, the numeral 10 indicates the signalling device of the present invention which is adapted to be used when a person is fishing through a hole such as the hole 12 in a body of ice 11.

The device of the present invention includes a base that comprises horizontally disposed bars 13 and 14 which may be arranged in crisscross relation with respect to each other, and which may be secured together, and the bars 13 and 14 are adapted to rest on the upper surface of the ice 11.

There is further provided a vertically disposed support member which is indicated generally by the numeral 15, and the support member 15 has a portion thereof projecting through the hole 12 in the ice 11, the support member 15 being secured to the bars 13 and 14. Journaled in the lower end of the support 15 is a first shaft 16 which has a reel 17 mounted thereon, and a fishing line 18 is trained over the reel 17 and has a hook 19 thereon which is adapted to be engaged by a fish such as the fish 20, Fig. 2.

Extending longitudinally through the support member 15 is a vertically disposed second shaft 21, there being a bevel gear 22 mounted on the lower end of the shaft 21, and the bevel gear 22 meshes with a bevel gear 23 on the first shaft 16. A bevel gear 24 is arranged on the upper end of the shaft 21, and the bevel gear 24 meshes with a bevel gear 25 on a horizontally disposed third shaft 26. The third shaft 26 is journaled in the upper portion of the support member 15, and a disc or circular plate 27 is connected to the third shaft 26.

As shown in Fig. 4 for example, a clamp 28 is secured to the disc 27 by means of suitable securing elements 29, and as shown in Fig. 7 the clamp 28 includes a body portion 31 which is provided with slits 32, and a suitable securing element such as a screw member 33 is arranged in threaded engagement with the body portion 31 adjacent the slits 32. A rod or arm 34 is adjustably mounted in the clamp 28, and a flag 35 is connected to one end of the rod 34, while a counterweight 36 is connected to the other end of the rod 34.

There is further provided a magnet 37 which is connected to the support member 15, and the magnet 37 is adapted to coact or cooperate with a bushing 38 that is connected to the rod 34 by means of a suitable securing element such as a set screw 39.

From the foregoing, it is apparent that there has been provided a signalling device whereby a person fishing through a hole such as the hole 12 in the ice 11, will be able to readily determine when a fish such as the fish 20 has struck. In use, with the parts arranged as shown in the drawings, it will be seen that when a fish 20 strikes the hook 19, the line 18 will be pulled and this will rotate the reel 17. Normally the flag 35 and rod 34 are stationary, but when the fish strikes the hook 19, flag 35 is rotated whereby the fisherman will know that a fish has struck so that such fish can be readily pulled in. Thus, when the fish 20 pulls on the line 18, the reel 17 will be turned and this in turn will turn the shaft 16 to which it is connected. Since the gear 23 on the shaft 16 meshes with the gear 22 on the shaft 21, it will be seen that rotation of the reel 17 will cause rotation of the vertical shaft 21. The gear 24 on the upper end of the shaft 21 meshes with the gear 25 on the shaft 26, and the shaft 26 has the disc 27 thereon so that rotation of the shaft 21 causes rotation of the disc 27. The rod 34 is connected to the disc 27 by means of the clamp 28 so that as the disc 27 is rotated, the rod 34 will be rotated whereby the flag 35 which is carried by an end of the rod 34 will be rotated so that as the line is being withdrawn from the reel, the flag 35 will be continually rotated so as to give a clear signal that a fish has struck. The counterweight 36 can be used for helping to balance the rod 34 in order to maintain the flag 35 in its proper position, and the weight 37 on the support member 15 may coact with the metal bushing 38 whereby the rod 34 and its associated parts will be maintained immobile until a fish has struck. In other words, the parts can be maintained in the position shown in Fig. 4 for example until a fish strikes, and when a fish strikes, the force of the fish pulling on the line will be sufficient to overcome the magnetic effect of the magnet 37 on the bushing 38 whereby the rod 34 will be free to rotate. By loosening the screw member 33 in the clamp 28, the position of the rod 34 in the clamp can be adjusted as desired. Similarly, the screw member 39 can be loosened to permit adjustment of the bushing 38 on the rod 34.

The fish tilt of the present invention utilizes miter gears or bevel gears so that as the reel 17 turns, the flag 35 turns round and round, and when the flag stops, the weight 36 serves as a balance, and by observing whether or not the flag is rotating, the person can tell whether the fish is pulling on the line. The tilt is easy to use and ruggedly constructed, and the line can be reeled in by either the left hand or right hand, and the various screw members are adjustable so that the parts can be adjusted as desired. The parts can be made of any suitable material and in different shapes or sizes. Due to the provision of the counterweight and magnet, the flag will not stop in a horizontal position so that at all times when it stops it will be in a vertical position which is more readily observable by the user. When the flag is rotating, it can be seen from a long distance away.

While I have shown a preferred form of my invention, I reserve all rights to such modifications as properly fall within the scope of the invention as claimed.

I claim:

1. In a signalling device, horizontally disposed bars secured together, a vertically disposed support member secured to said bars, a horizontally disposed first shaft journaled in the lower end of said support member, a reel mounted on said shaft and having a line trained thereover, a vertically disposed second shaft extending longitudinally through said support member, intermeshing bevel gears connecting said first and second shafts together, a horizontally disposed third shaft journaled in the upper portion of said support member, intermeshing bevel gears connecting said second and third shafts together, a disc connected to said third shaft, a clamp secured to said disc, a rod adjustably mounted in said clamp, a flag on one end of said rod, a counterweight on the other end of said rod, a magnet secured to said support member, and a bushing adjustably connected to said rod for coaction with said magnet.

2. In a signalling device, horizontally disposed bars secured together, a vertically disposed support member secured to said bars, a horizontally disposed first shaft journaled in the lower end of said support member, a reel mounted on said shaft and having a line trained thereover, a vertically disposed second shaft extending longitudinally through said support member, intermeshing bevel gears connecting said first and second shafts together, a horizontally disposed third shaft journaled in the upper portion of said support member, intermeshing bevel gears connecting said second and third shafts together, a disc connected to said third shaft, a clamp secured to said disc, a rod adjustably mounted in said clamp, a flag on one end of said rod, a counterweight on the other end of said rod, a magnet secured to said support member, and a bushing adjustably connected to said rod for coaction with said magnet, said clamp including a body member provided with a slit portion, and a manually operable screw member arranged in engagement with said body member adjacent said slit portion.

3. In a signalling device for ice fishing apparatus, horizontally disposed bars, a vertically disposed support member secured to said bars and having its lower end projecting through a hole in the ice, a horizontally disposed shaft journaled in the upper portion of said support member, a disc connected to said shaft, a clamp secured to said disc, a rod adjustably mounted in said clamp, a flag on one end of said rod, a counterweight on the other end of said rod, a rotary reel arranged adjacent the lower end of said support member, said flag being arranged adjacent the upper end of said support member, and means for rotating said flag when said reel rotates.

4. In a signalling device for ice fishing apparatus, horizontally disposed bars, a vertically disposed support member secured to said bars and having its lower end projecting through a hole in the ice, a horizontally disposed shaft journaled in the upper portion of said support member, a disc connected to said shaft, a clamp secured to said disc, a rod adjustably mounted in said clamp, a flag on one end of said rod, a counterweight on the other end of said rod, a rotary reel arranged adjacent the lower end of said support member, said flag being arranged adjacent the upper end of said support member, and means for rotating said flag when said reel rotates, said means including intermeshing bevel gears.

References Cited in the file of this patent

UNITED STATES PATENTS 2,506,092     Lyons                May 2, 1950